United States Patent [19]

Said

[11] 3,984,273

[45] Oct. 5, 1976

[54] DECAL APPLYING METHOD

[75] Inventor: Donald F. Said, Corning, N.Y.

[73] Assignee: Corning Glass Works, Corning, N.Y.

[22] Filed: Oct. 20, 1975

[21] Appl. No.: 623,617

[52] U.S. Cl. .................................. 156/234; 156/90; 156/238; 156/240; 156/289; 156/297; 156/320; 156/321

[51] Int. Cl.² ..................... B44C 1/16; B32B 31/20; B65C 9/25; C09J 5/06

[58] Field of Search ............ 156/234, 238, 240, 89, 156/90, 289, 320, 321, 322, 344, 254, 297; 427/148, 152; 428/914

[56] References Cited

UNITED STATES PATENTS

| | | | |
|---|---|---|---|
| 1,647,362 | 11/1927 | Hughes | 156/89 UX |
| 2,644,262 | 7/1953 | Schoenberg et al. | 156/234 X |
| 2,676,726 | 4/1954 | Von Hofe | 156/320 |
| 2,970,076 | 1/1961 | Porth | 156/89 |
| 2,990,311 | 6/1961 | Shepherd, Jr. | 156/234 |
| 3,007,829 | 11/1961 | Akkeron | 156/89 |
| 3,445,309 | 5/1969 | Milliken | 156/89 |
| 3,574,049 | 4/1971 | Sander | 156/234 X |
| 3,813,268 | 5/1974 | Kerwin | 156/247 X |

*Primary Examiner*—William A. Powell
*Assistant Examiner*—Thomas Bokan
*Attorney, Agent, or Firm*—Charles W. Gregg; Burton R. Turner; Clarence R. Patty, Jr.

[57] ABSTRACT

An improvement in a method of transferring or applying a decal design of a heat release decal or decalcomania to a flat surface such as the flat bottom surface of the concavity of a dish-like article and with only a limited amount or without an appreciable amount of the heat release coating surrounding the decal design being transferred to the flat surface. A mask of a thin resilient material, such as silicone rubber for example, is disposed adjacent the flat surface, such mask embodying a hole or opening having a shape or configuration geometrically similar to the shape of but slightly larger than the face of a pressure head used in applying the design so that, during the transfer operation, the transfer to the flat surface of any appreciable amount of the heat release coating surrounding the decal design is prevented.

4 Claims, 3 Drawing Figures

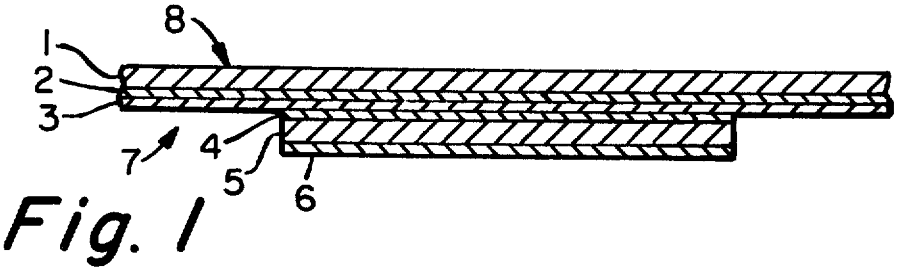
Fig. 1
Fig. 2
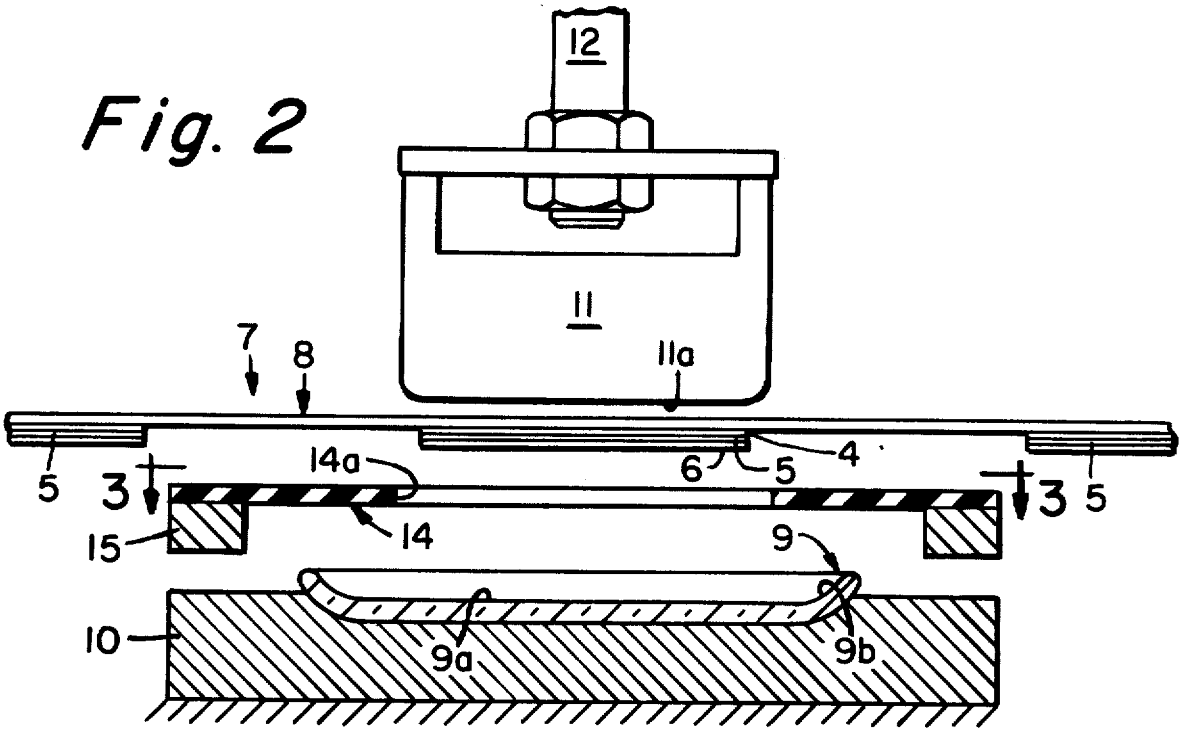
Fig. 3
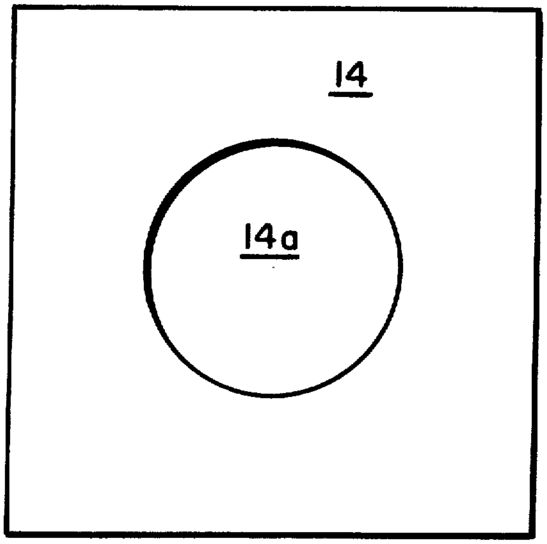

DECAL APPLYING METHOD

BACKGROUND OF THE INVENTION

There is disclosed in U.S. Pat. No. 3,445,309, for example, a method of applying or transferring a decal or decalcomania design to a surface of an article of glassware to be decorated. With reference to FIG. 1 of said patent, it will be noted that the wax or heat release coating 3 of the decalcomania or decal shown in such drawing is somewhat larger in area or expanse than the design 5 to be transferred to a surface to be decorated. Such larger area or expanse of the heat release coating is, of course, transferred or applied to said surface along with that portion of such coating carrying the decal design 5. In many cases this would pose no problem. However, where it is desired to apply another decoration to said surface in relatively close proximity to the outer periphery of the decal design, it is necessary prior to the applying of such other decoration, to remove the heat release coating as, for example, by firing the article to volatize such coating. As is believed readily apparent, it would be more economical if the second or said other decoration could be applied to said surface and fired at the same time as the first decoration since a second firing step or other coating removal step, could thereby be eliminated.

There is disclosed in U.S. Pat. No. 3,813,268 a machine and method of applying or transferring indicia or decalcomanias (decal designs) from a rolled carrier web or strip to a series of articles. Such decalcomanias or decals may, for example, be heat release decals similar to that shown in the aforesaid U.S. Pat. No. 3,445,309 and, as pointed out in lines 19 through 23 of column 2 and in lines 35, 36 and 37 of column 4 of U.S. Pat. No. 3,813,268, the machine and method disclosed in such patent may be employed in processing flat articles or articles having shapes different than a cylindrical tumbler or glass bottle such as illustrated in the latter patent. If, then, a series or succession of articles each having a flat surface to which a decal design is to be applied or transferred are successively moved past a reel of heat release decal transfer tape or web as in U.S. Pat. No. 3,813,268, the part of the heat release coating on such tape extending between successive decals is very apt to be applied to areas of the articles on which it is desired to apply another or second design as previously mentioned. For example, if each of a succession of dish-like articles are to have a decal design applied to the flat inner bottom surface of the respective article, that is, to the flat bottom surface of the concavity of the article, at least part of the heat release coating between the successive decals on a tape such as that mentioned will probably also be applied or transferred to the upwardly sloping edges or verges of the dish-like articles. Therefore, before there may be applied a second or another decoration such as, for example, a stripe or series thereof extending about the verge or brim of each said dish-like article, it is necessary to remove the heat release coating which is applied to such verge or brim by the decal design transfer or application operation.

SUMMARY OF THE INVENTION

It is, accordingly, an object of the present invention to provide an improved method of applying or transferring a decal design of the heat release type of decal to a flat surface, such improvement being especially useful in practicing the inventions disclosed in said U.S. Pat. No. 3,813,268 when such inventions are used, for example, in applying or transferring decal designs to the flat inner bottom surfaces of dish-like articles.

Other objects and characteristic features of the invention will become apparent as the description proceeds.

BRIEF DESCRIPTION OF THE DRAWINGS

In the drawings:

FIG. 1 is a diagrammatic cross-sectional view, on an exaggerated scale, of a decal or decalcomania of the heat release type and used in practicing the invention disclosed;

FIG. 2 comprises a schematic view of a simple apparatus arrangement which may be used in practicing the invention; and FIG. 3 is a top plan view, on a reduced scale, of part of the apparatus of FIG. 2, such view being taken generally along line 3—3 of FIG. 2.

Similar reference characters refer to similar parts in each of the Figs. of the drawings.

PREFERRED EMBODIMENT OF THE INVENTION

Referring to the drawings in detail, there is shown in FIG. 1 a heat release decal or decalcomania 7 which includes a backing 8 comprising a strip of material such as paper, for example, a barrier layer or coating 2 on one surface or side of such strip and, superimposed over barrier layer 2, a heat release layer or coating 3 of a wax-like heat release material which permits the remainder of the decal or decalcomania, comprising layers 4, 5 and 6, to be released as a unit from the backing 8. Layer 4 is a clear resinous film applied over the heat release coating or layer 3 and layer 5 is the design layer of the decal or decalcomania, that is, is the decal design that is to be applied to a surface for decorating or other purposes. Layer 6 is optional but, when used, may comprise a clear layer of resinous material. Decals or decalcomanias such as 7 are well known in the art and, if more details of a decal such as 7 are desired, reference may be made to column 2, lines 32 through 72, and column 3, lines 1 through 47 of the aforementioned U.S. Pat. No. 3,445,309. However, backing 8, including the strip of paper or other material, the barrier layer 2 and the heat release layer or coating 3 of the decal 7 shown in FIG. 1 may be considered to be of indeterminate length and such layers are intended to be so shown in such drawing Fig. Therefore, the decal 7 may be considered to be similar to the so-called web 20 of said U.S. Pat. No. 3,813,268. It is further pointed out, however, that the practice of the present invention is not intended to be restricted to the use of a web as in U.S. Pat. No. 3,813,268 but that the inventive method disclosed can also be used with apparatus such as is used in applying decals or decalcomanias of the type shown in FIG. 1 of U.S. Pat. No. 3,445,309, that is, decals embodying a single design.

Referring now to FIG. 2 of the drawings, there is shown, in cross-section for purposes of clarity, a dish-like article 9 held in a suitable support member 10, such as a vacuum chuck for example, and to the inner flat bottom surface 9*a* of which article a decal design is to be applied. For the purposes of applying such design, there is schematically shown in FIG. 2, a decal such as 7 of FIG. 1 including backing 8 and which may, for example, be fed from suitable reels and rollers etc. so that it is arranged over said flat bottom surface 9*a* of article 9 with the center of a decal design layer 5 of decal 7 vertically aligned with the center of such bottom surface. It will be readily understood that decal 7 (FIG. 1) is selected so that the designs such as 5 thereof are of an overall size suitable for applying to a surface 9*a* of an article such as 9, that is, so that each such design is not too large for the application thereof to such a surface.

There is shown above decal 7 in FIG. 2 a pressure head 11 which is at times actuated downwardly by an actuating rod 12 so that face 11*a* of such pressure head contacts decal 7 and presses layers 4, 5 and 6 into contact with surface 9*a* of the article such as 9 to transfer or apply the decal design 5 of the decal and positioned over surface 9*a* to such surface. Face 11*a* of pressure head 11 is only slightly larger than said decal design 5. Apparatuses such as thus far described are well known in the art.

As previously pointed out, when applying a heat release decal design as described above, the heat release coating or layer 3 of the backing 8 of the decal and surrounding the decal design such as 5 is apt to also be transferred to the inner surface 9*a* of an article such as 9 by the depressing of backing 8 along with design 5, thereby preventing the application of any further decoration to the areas of such inner surface surrounding the transferred design unless such heat release coating is first removed from said areas. Since such a coating is usually removed during firing of such an article, said additional or further decoration desired would require an additional firing step in the decorating of the article, or some other additional step for removal of the excess transferred or applied heat release coating, as is believed apparent. The method of the present invention obviates the necessity for either one of such additional steps.

Returning to FIG. 2 taken in conjunction with FIG. 3, there is shown in cross-section and disposed adjacent or above surface 9*a* of article 9, that is, between decal 7 and such article, a mask 14 of a thin resilient material such as a thin sheet of silicone rubber for example. Such sheet is secured about the borders thereof and in any convenient manner to a suitable frame 15, and the sheet embodies in the general center thereof a hole or opening 14*a* which has an overall shape geometrically similar to a decal design such as 5 of decal 7 and very slightly larger than face 11*a* of pressure head 11. Mask 14 is disposed as mentioned with the center of hole or opening 14*a* in such mask vertically aligned with the center of face 11*a* of pressure head 11 and the center of the decal design 5 on decal 7 that is shown in FIG. 2 as positioned over surface 9*a*. When pressure head 11 is now actuated downwardly to press, or transfer or apply, the decal design to surface 9*a*, the portion of heat release layer 3 of backing 8 surronding layers 4, 5 and 6 of the decal is also depressed by the depressing of backing 8 but such layer 3 is substantially prevented by mask 14 from contacting the portion of the inner surface of article 9 to which the decal design 5 is not applied. This is especially true of the sloping edge or verge portion 9*b* of article 9 to which it may be desired to apply additional decorations such as, for example, one or more stripes or bands painted on such edge or verge.

It is believed expedient to point out that, for the purpose of actuating the heat release coating 3 of a decal such as 7 for release, and application or transfer, of a decal design such as 5 to a surface such as 9*a*, for example, either article 9 or the face such as 11*a* of a pressure head such as 11, or both, must be heated, as is well known to those skilled in the art.

Although there is herein set forth only one example of practicing the improved method of the invention disclosed, it will be understood that such is not to be considered in any way limiting but that various changes and modifications may be made therein within the purview of the appended claims without departing from the spirit and scope thereof.

What is claimed is:

1. In a method of transferring or applying to a flat surface a decal design of a heat release decal and including the step of using the face of a pressure head for pressing the decal into firm contact with said surface; the improvement comprising the step of disposing a mask of a thin resilient material adjacent said flat surface prior to said pressing step, such mask embodying a hole having an overall shape geometrically similar to and slightly larger than said face of said pressure head, whereby, during said pressing step, only a limited amount of the decal heat release coating surrounding said decal design is transferred to said flat surface.

2. The method of claim 1 and in which said flat surface is the flat bottom surface of the concavity of a dish-like article.

3. The method of claim 1 and in which said decal includes a strip of material and said decal design is one of a succession of similar spaced apart decal designs carried by said strip of material.

4. The method of claim 2 and in which said decal includes a strip of material and said decal design is one of a succession of similar spaced apart decal designs carried by said strip of material.

* * * * *